(12) United States Patent
Yasuda et al.

(10) Patent No.: US 10,840,690 B2
(45) Date of Patent: Nov. 17, 2020

(54) NON-OHMIC COMPOSITION AND METHOD FOR MANUFACTURING SAME, CABLE INTERCONNECT UNIT AND CABLE END-CONNECT UNIT

(71) Applicant: SUMITOMO ELECTRIC INDUSTRIES, LTD., Osaka (JP)

(72) Inventors: Shuhei Yasuda, Osaka (JP); Takanori Yamazaki, Osaka (JP); Yoshiyuki Inoue, Osaka (JP); Ryota Fukumoto, Osaka (JP); Yoitsu Sekiguchi, Osaka (JP); Shoshi Katakai, Osaka (JP); Shinya Nishikawa, Osaka (JP); Hiroshi Hayami, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/623,497

(22) PCT Filed: Jun. 11, 2018

(86) PCT No.: PCT/JP2018/022263
§ 371 (c)(1),
(2) Date: Dec. 17, 2019

(87) PCT Pub. No.: WO2019/012885
PCT Pub. Date: Jan. 17, 2019

(65) Prior Publication Data
US 2020/0203942 A1    Jun. 25, 2020

(30) Foreign Application Priority Data

Jul. 13, 2017    (JP) .................................. 2017-137131

(51) Int. Cl.
*H01B 9/00*        (2006.01)
*H02G 15/064*   (2006.01)
(Continued)

(52) U.S. Cl.
CPC ............. *H02G 15/064* (2013.01); *H01B 3/28* (2013.01); *H01B 9/027* (2013.01); *H01B 19/00* (2013.01);
(Continued)

(58) Field of Classification Search
CPC ...... H01R 4/70; H01R 43/26; H02G 15/1826; H02G 15/003; H02G 15/013; H02G 15/184
(Continued)

(56) References Cited

U.S. PATENT DOCUMENTS 3,816,640 A * 6/1974 Varner .................. H02G 15/18
                                                                    174/73.1
4,383,131 A * 5/1983 Clabburn ............... H02G 15/10
                                                                    156/49
(Continued)

FOREIGN PATENT DOCUMENTS

CN          202474799 U       10/2012
JP          54-137651 A  *   10/1979 ............... H01B 1/20
(Continued)

*Primary Examiner* — William H. Mayo, III
(74) *Attorney, Agent, or Firm* — IPUSA, PLLC

(57) ABSTRACT

A tubular cable interconnect unit arranged on an outer periphery of a joint of a power cable, includes a tubular insulating tube, a non-ohmic resistor layer formed from a non-ohmic composition and provided on an inner peripheral surface of the insulating tube, and an inner semiconductive layer provided on the non-ohmic resistor layer, wherein the non-ohmic composition includes a base polymer including at least one of thermoplastic and rubber, and varistor grains having a non-ohmic characteristic in which a volume resistivity varies non-linearly with respect to an applied voltage, and the varistor grains have a maximum grain diameter of 30 μm or less.

17 Claims, 4 Drawing Sheets

(51) Int. Cl.
- *H01B 3/28* (2006.01)
- *H01B 9/02* (2006.01)
- *H01B 19/00* (2006.01)
- *H01C 7/10* (2006.01)
- *H01R 4/20* (2006.01)
- *H02G 15/18* (2006.01)

(52) U.S. Cl.
CPC ............... *H01C 7/10* (2013.01); *H01R 4/20* (2013.01); *H02G 15/18* (2013.01)

(58) Field of Classification Search
USPC ....... 174/73.1, 74 R, 77 R, 78, 84 R, 91, 92, 174/DIG. 8; 428/36.9, 36.91, 36.92, 34.9, 428/35.1, 35.7, 36.8
See application file for complete search history.

(56) References Cited

U.S. PATENT DOCUMENTS

| | | | | |
|---|---|---|---|---|
| 4,446,331 A * | 5/1984 | Takaoka | ............... | H02G 15/003 174/73.1 |
| 4,470,898 A * | 9/1984 | Penneck | ............... | H01B 3/004 252/511 |
| 4,505,033 A * | 3/1985 | Wheeler | ............... | B29C 48/001 29/887 |
| 4,681,717 A * | 7/1987 | Brooks | ............... | C01G 9/00 252/519.54 |
| 4,791,245 A * | 12/1988 | Thornley | ............... | H01R 4/72 174/73.1 |
| 6,124,549 A * | 9/2000 | Kemp | ............... | H02G 15/068 174/73.1 |
| 6,171,669 B1 * | 1/2001 | Vallauri | ............... | H02G 15/184 428/34.9 |
| 6,737,587 B2 * | 5/2004 | Amerpohl | ............ | H02G 15/068 174/142 |
| 7,170,004 B2 * | 1/2007 | Gramespacher | ..... | H02G 15/068 174/73.1 |
| 7,901,243 B1 * | 3/2011 | Yaworski | ................ | H01R 4/34 439/523 |
| 8,134,071 B2 * | 3/2012 | Aue | ...................... | H02G 15/103 174/88 R |
| 8,435,427 B2 * | 5/2013 | Ghosh | ...................... | H01B 1/22 252/519.12 |
| 8,525,025 B2 * | 9/2013 | Li | ........................... | H01R 9/05 174/73.1 |
| 8,637,769 B2 * | 1/2014 | Denndoerfer | ........ | H01B 17/325 174/73.1 |
| 9,178,289 B2 * | 11/2015 | Seraj | ........................ | H01R 4/70 |
| 2007/0272428 A1 * | 11/2007 | Bayon | .................. | H02G 15/188 174/73.1 |
| 2010/0279542 A1 * | 11/2010 | Seraj | ......................... | H02G 15/1833 439/502 |
| 2014/0065420 A1 | 3/2014 | Sonerud et al. | | |
| 2014/0116746 A1 * | 5/2014 | Rapp | .................... | H02G 15/105 174/73.1 |

FOREIGN PATENT DOCUMENTS

| | | |
|---|---|---|
| JP | S54-137651 | 10/1979 |
| JP | 2002-170704 | 6/2002 |
| JP | 2005-006379 | 1/2005 |
| JP | 2010-213428 | 9/2010 |
| JP | 2012-142377 | 7/2012 |
| JP | 2013-212045 | 10/2013 |
| JP | 2014-518500 | 7/2014 |
| JP | 2016-017161 | 2/2016 |

* cited by examiner

FIG.4

| | | | EXEMPLARY IMPLEMENTATION | | | | | | | COMPARISON EXAMPLE |
|---|---|---|---|---|---|---|---|---|---|---|
| | | | 1 | 2 | 3 | 4 | 5 | 6 | 7 | 1 |
| COMPOSITION | BASE POLYMER | EPDM | 100 | 100 | 100 | 100 | 100 | 100 | 100 | 100 |
| | VARISTOR GRAINS | ZINC OXIDE VARISTOR GRAINS A (MAXIMUM GRAIN DIAMETER 30 μm) | 310 | - | - | - | - | - | - | - |
| | | ZINC OXIDE VARISTOR GRAINS B (MAXIMUM GRAIN DIAMETER 10 μm) | - | 310 | - | - | - | - | - | - |
| | | ZINC OXIDE VARISTOR GRAINS C (MAXIMUM GRAIN DIAMETER 10 μm, HYDROPHOBIC SURFACE TREATMENT) | - | - | 310 | 130 | 180 | 725 | 890 | - |
| | | ZINC OXIDE VARISTOR GRAINS D (MAXIMUM GRAIN DIAMETER 100 μm) | - | - | - | - | - | - | - | 310 |
| | OTHER ADDITIVES | CROSSLINKING AGENT DCP | 1.5 | 1.5 | 1.5 | 1.5 | 1.5 | 1.5 | 1.5 | 1.5 |
| | | COAGENT ZINC FLOWER NUMBER 3 | 5 | 5 | 5 | 5 | 5 | 5 | 5 | 5 |
| | | PLASTICIZER POLYBUTADIENE OIL | 10 | 10 | 10 | 10 | 10 | 10 | 10 | 10 |
| | | ANTIOXIDANT TMDQ | 1.5 | 1.5 | 1.5 | 1.5 | 1.5 | 1.5 | 1.5 | 1.5 |
| | VOLUME RATIO [-] OF VARISTOR GRAINS | | 0.3 | 0.3 | 0.3 | 0.15 | 0.2 | 0.5 | 0.55 | 0.3 |
| EVALUATION | INSULATION BREAKDOWN STRENGTH | DC INSULATION BREAKDOWN STRENGTH [kV/mm] | 12 | 14 | 21 | 27 | 25 | 10 | 8 | 2 |
| | | Imp INSULATION BREAKDOWN STRENGTH [kV/mm] | 15 | 20 | 29 | 36 | 31 | 16 | 13 | 3 |
| | TENSILE PROPERTIES | STRETCH AT BREAK [%] | 190 | 140 | 150 | 170 | 155 | 135 | 120 | 180 |
| | | TENSILE BREAKING STRENGTH [MPa] | 7.5 | 10.5 | 11.7 | 10 | 11 | 9.8 | 8.3 | 3.5 |
| | VARISTOR CHARACTERISTICS | NON-LINEAR INDEX α | 6.2 | 5.6 | 6.1 | 1.3 | 5.8 | 5.5 | 4.2 | 10.5 |

NON-OHMIC COMPOSITION AND METHOD FOR MANUFACTURING SAME, CABLE INTERCONNECT UNIT AND CABLE END-CONNECT UNIT

TECHNICAL FIELD

The present invention relates to a non-ohmic composition and a method for manufacturing the same, a cable interconnect unit and a cable end-connect unit.

This application is based upon and claims priority to Japanese Patent Application No. 2017-137131, filed on Jul. 13, 2017, the entire contents of which are incorporated herein by reference.

BACKGROUND ART

A pair of power cables may be joined linearly by abutting each other while matching axes thereof. In this case, a crimping sleeve may join conductors of the pair of power cables by a compression joint, and a cable interconnect unit is mounted in a periphery of the joint (for example, refer to Patent Document 1).

The cable interconnect unit is a tubular member formed by a rubber material or the like, and an inner diameter of the cable interconnect unit is formed to be smaller than an outer diameter of the joint of the power cables. The cable interconnect unit is mounted as follows, for example. First, a jig is used to enlarge a diameter of the cable interconnect unit to become larger than the outer diameter of the joint. Next, in a state where one of the power cables is inserted into the enlarged cable interconnect unit, the crump sleeve joins the conductors of the power cables by the compression joint. Thereafter, the cable interconnect unit is moved to and arranged at a periphery of the crimp sleeve, and the jig is removed. Accordingly, the cable interconnect unit resiliently contracts and is mounted at the joint of the power cables.

In addition, a cable end-connect unit may be provided, in order to join the power cable and an overhead transmission line or the like. For example, the cable end-connect unit includes a porcelain tube, inserted with the power cable, and filled with an insulating medium between the porcelain tube and the power cable. In this case, the power cable is successively peeled from one end. In other words, the cable conductor, the cable insulator, and the cable outer semiconductive layer are exposed in this order from one end of the power cable. The end-connect unit is mounted for the purposes of limiting the electric field at the part of the cable where the insulator is exposed and the part of the cable where the outer semiconductive layer is exposed (for example, refer to Patent Document 2).

PRIOR ART DOCUMENTS

Patent Documents

Patent Document 1: Japanese Laid-Open Patent Publication No. 2010-213428
Patent Document 2: Japanese Laid-Open Patent Publication No. 2005-6379

DISCLOSURE OF THE INVENTION

According to one aspect of the present disclosure, there is provided a tubular cable interconnect unit arranged on an outer periphery of a joint of a power cable, including
a tubular insulating tube;
a non-ohmic resistor layer formed from a non-ohmic composition and provided on an inner peripheral surface of the insulating tube; and
an inner semiconductive layer provided on the non-ohmic resistor layer,
wherein the non-ohmic composition includes a base polymer including at least one of thermoplastic and rubber, and varistor grains having a non-ohmic characteristic in which a volume resistivity varies non-linearly with respect to an applied voltage, and the varistor grains have a maximum grain diameter of 30 μm or less.

According to another aspect of the present disclosure, there is provided a tubular cable end-connect unit arranged on an outer periphery of a power cable accommodated within a porcelain tube, including
a tubular insulation tube; and
a non-ohmic resistor layer formed from a non-ohmic composition and provided on an inner peripheral surface of the insulating tube,
wherein the non-ohmic composition includes a base polymer including at least one of thermoplastic and rubber, and varistor grains having a non-ohmic characteristic in which a volume resistivity varies non-linearly with respect to an applied voltage, and the varistor grains have a maximum grain diameter of 30 μm or less.

According to still another aspect of the present disclosure, there is provided a non-ohmic composition including
a base polymer including at least one of thermoplastic and rubber; and
varistor grains having a non-ohmic characteristic in which a volume resistivity varies non-linearly with respect to an applied voltage,
wherein the varistor grains have a maximum grain diameter of 30 μm or less.

According to another aspect of the present disclosure, there is provided a method for manufacturing a non-ohmic composition, including
a crushing process that crushes coarse varistor grains having a non-ohmic characteristic in which a volume resistivity varies non-linearly with respect to an applied voltage into varistor grains having a maximum diameter of 30 μm or less; and
a mixing process that mixes the varistor grains with a base polymer including at least one of thermoplastic and rubber.

BRIEF DESCRIPTION OF DRAWINGS

FIG. 4 is a table for explaining compositions and evaluations of exemplary implementations and a comparison example.

MODE OF CARRYING OUT THE INVENTION

Figure 1:
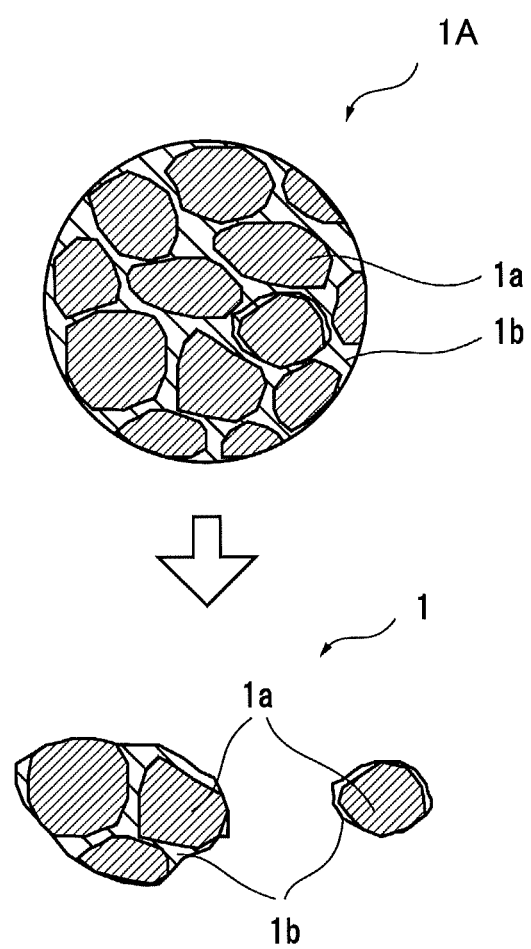
FIG. 1 is a schematic diagram for explaining varistor grains in a present embodiment.

Problem to be Solved by the Invention

From a viewpoint of further stabilizing electrical characteristics at a joint of power cables, a cable interconnect unit and a cable end-connect unit are required to further relax the concentration of electric field. In addition, a high electrical breakdown strength is required to maintain desired electrical characteristics at a high voltage.

Accordingly, it is one object of the present disclosure to provide a novel technique that improves an electrical breakdown strength, while stabilizing electrical characteristics at the joint of the power cables.

Effects of Present Disclosure

According to the present disclosure, it is possible to improve the electrical breakdown strength, while stabilizing the electrical characteristics at the joint of the power cable.

Description of Embodiments of Present Invention

The present inventors studied methods of further relaxing concentration of the electric field at the joint of the power cables, and devised providing a non-ohmic resistor on an inner surface of tubular cable interconnect unit and cable end-connect unit. The non-ohmic resistor is a non-ohmic member having a volume resistivity that changes non-linearly with respect to an applied voltage, such as a volume resistivity that rapidly decreases (that is, a current rapidly increases) as the voltage increases, and is mounted and used in an electronic device as a withstand voltage protection element (or varistor element), for example.

For example, the non-ohmic resistor may be formed by adding a metal oxide such as bismuth or the like, to a metal oxide such as zinc oxide or the like, to form a metal oxide varistor as a bulk body by firing, or by using a non-ohmic composition in which varistor grains including a metal oxide such as zinc oxide, bismuth or the like, are blended to a base polymer such as a resin, rubber or the like.

Because the non-ohmic composition has a moldability that enables application to the cable interconnect unit or the like, the present inventors conceived that the concentration of the electric field can be relaxed when the non-ohmic resistor is formed using the non-ohmic composition, and the non-ohmic resistor is arranged at the joint of the power cables. On the other hand, the non-ohmic resistor tends to have a low electrical breakdown strength, and it was confirmed that the electrical breakdown is likely to occur at a high voltage. In other words, the non-ohmic resistor may not stably function at the joint of high-voltage power cables.

When the present inventors studied the cause for the tendency of the non-ohmic resistor to have the low electrical breakdown strength, the present inventors conceived that inconsistencies in the grain diameters of the varistor grains included in the non-ohmic resistor are the cause.

Generally, non-ohmic resistance characteristics of the varistor grains (hereinafter also referred to as varistor characteristics) improve as the grain diameter increases, and thus, it is regarded better to use varistor grains having a relatively large grain diameter for the non-ohmic resistor. For this reason, the varistor grains granulated using a metal oxide such as zinc oxide, bismuth or the like, for example, and having a relatively large grain diameter of 100 μm or greater, may be used as they are for the non-ohmic resistor.

However, according to studies conducted by the present inventors, when using the varistor grains having the large grain diameter, it was found that the varistor grains may collapse and become crushed due to shear force when the varistor grains are blended to the base polymer and kneaded. Particularly because a material having a high viscosity such as rubber or the like, for example, requires a large shear force to enable kneading, the varistor grains are more likely to collapse. Furthermore, because the shear force that is received differs for each grain, the grain diameters of the varistor grains become considerably inconsistent in the non-ohmic resistor that is finally formed. In the case of such an ohmic resistor, an electrical field concentrates on the varistor grains when a high voltage is applied thereto, to easily cause insulation breakdown and deteriorate the insulation breakdown strength.

Accordingly, the present inventors studied methods of reducing inconsistencies in the grain diameters of the varistor grains in the non-ohmic resistor. As a result, the present inventors conceived that the grain diameter of the varistor grains mixed to the base polymer preferably has a size that does not cause collapse due to the shear force during the kneading, more particularly, has a maximum grain diameter of 30 μm or less. According to such varistor grains, it is possible to generate desired varistor characteristics in the non-ohmic resistor, and simultaneously reduce the inconsistencies in the grain diameters without causing excessive collapse of the varistor grains during the kneading, to maintain a high insulation breakdown strength of the non-ohmic resistor. The present disclosure is based on such findings.

<Non-Ohmic Composition>

First, a non-ohmic composition according to one embodiment of the present invention will be described. In this specification, a numerical range that is represented using "to" refers to a range that includes numerical values indicated before and after "to" as a lower limit value and an upper limit value of the range.

The non-ohmic composition in this embodiment includes the base polymer including at least one of thermoplastic and rubber, and the varistor grains. Each of these components will be described in the following.

(Base Polymer)

At least one of the thermoplastic and the rubber may be used for the base polymer, and the base polymer may be appropriately modified according to the usage of the non-ohmic resistor. For example, when providing the non-ohmic resistor as a layer of the cable interconnect unit as will be described later, the rubber is preferably used for the base polymer because the non-ohmic resistor is required to resiliently deform. From a viewpoint of increasing the mechanical strength such as a tensile strength or the like of the non-ohmic resistor, the rubber preferably has a high Mooney viscosity that is obtained by a method prescribed in JIS K6300, and a ML(1+4)100° C. is preferably 35 or higher and 60 or lower. In addition, since rubber is easily crosslinked, the rubber is preferably Ethylene-Propylene-Diene-Monomer (EPDM). On the other hand, when a large resilient deformation of the non-ohmic resistor is not required, the thermoplastic resin may be used for the base polymer, and from a viewpoint of increasing the mechanical strength, the thermoplastic preferably has a low Melt Flow Rate (MFR) of 0.8 or higher and 5.0 or lower. The MFR is a value that is measured by a method prescribed by JIS K7210 under a condition in which the temperature is 190° C. and the load is 2.16 kg.

(Varistor Grains)

The varistor grains are formed by crushing varistor grains, that are obtained by mixing the metal oxide such as zinc oxide, bismuth or the like, for example, and spray granulating the mixture, and have a relatively large grain diameter (hereinafter also referred to as coarse varistor grains). As illustrated in FIG. 1, a coarse varistor grain 1A is a polycrystalline grain in which a plurality of crystal parts 1a including the metal oxide are bonded via grain boundary parts 1b including another metal oxide, and has an average grain diameter of 25 μm to 100 μm, for example. A varistor grain 1 in this embodiment is refined to have a maximum grain diameter of 30 μm or less, by crushing the coarse varistor grain 1A, and includes the crystal parts 1a and the grain boundary parts 1b. The varistor grain 1 has a non-ohmic characteristic in which a volume resistivity varies non-linearly with respect to the applied voltage. More particularly, the varistor grain 1 functions as an insulator when a certain voltage is applied and the grain boundary part 1b acts as a resistance, and on the other hand, functions as a conductor when a voltage exceeding a predetermined voltage is applied and a current flows and penetrates the grain boundary part 1b between 2 adjacent crystal parts 1a.

In the varistor grain 1, the crystal part 1a includes at least one of zinc oxide, silicon carbide, strontium titanate, barium titanate, for example. From a viewpoint of increasing the non-ohmic resistance characteristics and maximum energy, the crystal part 1a preferably includes zinc oxide.

In the varistor grain 1, the grain boundary part 1b includes at least an oxide such as bismuth, antimony, manganese, cobalt, nickel, or the like, for example. From a viewpoint of improving the non-ohmic resistance characteristics, the grain boundary part 1b preferably includes bismuth or antimony.

The varistor grains have a maximum grain diameter of 30 μm or less. As described above, in this embodiment, the maximum grain diameter of the varistor grains is set to 30 μm or less, from the viewpoint of reducing the collapse of the varistor grains when the varistor grains are blended to the base polymer and kneaded, and reducing the inconsistency in the grain diameters caused by the collapse of the varistor grains. Hence, the insulation breakdown strength of the non-ohmic resistor can be maintained high. From a viewpoint of further increasing the insulation breakdown strength, the maximum grain diameter is preferably 10 μm or less. On the other hand, from a viewpoint of obtaining the desired varistor characteristics, the maximum grain diameter is preferably 1.5 μm or greater.

The varistor grains are preferably formed to have small inconsistencies in the grain diameters. More particularly, preferably, a grain diameter D50 at 50% accumulation is 1.0 μm to 10 μm, a grain diameter D90 at 90% accumulation is 2.0 μm to 25 μm in the volume grain size distribution, and D90/D50 is 2.5 or less. Because the grain size distribution of the varistor grains is narrow and the inconsistencies in the grain diameters are small, it is possible to generate the desired non-ohmic resistance characteristics, and simultaneously maintain the high insulation breakdown strength.

The varistor grains are preferably formed by crushing the large varistor grains. The method of crushing is not particularly limited, but is preferably an airflow type method. According to the studies conducted by the present inventors, the airflow type method can crush the varistor grains without collapsing the crystal structure of the varistor grains, and can also reduce the inconsistencies in the grain diameters, when compared to other crushing methods.

More particularly, in the case of the other crushing methods such using a ball mill, a hammer mill, or the like, excessive forces of impact, shear, compression, or the like are applied to the coarse grain 1A illustrated in FIG. 1. For this reason, not only the grain boundary parts 1b but also the crystal parts 1a of the coarse grains 1A are broken down and crushed into the varistor grains. In the varistor grains that are obtained in this manner, the crystal structure of the coarse grains 1A is broken down considerably, and depending on the grains, interfaces of the crystal part 1a and the grain boundary part 1b, contributing to the varistor characteristics, may be insufficient or may not exist, and sufficient varistor characteristics may not be obtainable.

On the other hand, in the case of the airflow type crushing method, the air flow causes the coarse grains to collide with each other and become crushed by the energy of the collision, and thus, no excessive forces are applied to the coarse grain 1A. For this reason, as illustrated in FIG. 1, mainly the grain boundary parts 1b of the coarse grain 1A are broken down when the coarse grain 1A is crushed into the refined varistor grains 1, however, the extent of breaking down the grain boundary parts 1b is small, and the crystal parts 1a are not greatly broken down and can easily maintain shapes thereof. As a result, in the varistor grains 1 that are obtained, the grain boundary part 1b is not only formed between the crystal parts 1a but is also formed at the surface of the grain 1. Hence, the varistor grains 1 obtained by the airflow type crushing method have the maximum grain diameter of 30 μm or less, which is relatively small, but a large number of grains include a large number of interfaces between the crystal part 1a and the grain boundary part 1b, to thereby exhibit excellent varistor characteristics.

The varistor grains preferably include a surface-treated layer including a silane compound. The silane compound is the so-called silane coupling agent, and for example, a silicon compound including, at a terminal thereof, a hydrolytic silane group that becomes a silanol group by hydrolysis, may be used for the silane compound. More particularly, trimethoxyvinyl-silane, triethoxyvinylsilane, methyldimethoxyvinylsilane, or the like may be used for the silane compound. The surface-treated layer not only reduces cohesion of the varistor grains, but also increases adhesion to the base polymer, and improves tensile properties (stretch at break, and tensile breaking strength) of the non-ohmic composition. Moreover, interfacial peeling between the base polymer and the varistor grains can be reduced, to improve the insulation breakdown strength of the non-ohmic composition. In addition, in this embodiment, the varistor grains uneasily collapse during the kneading, and the surface-treated layer is uneasily peeled. For this reason, the varistor grains can exist within the non-ohmic resistor in a state where the surface-treated layer is provided on the entire surface of the grain, and it is possible to further improve the tensile properties and further increase the insulation breakdown strength.

A blending amount of the varistor grains may be appropriately adjusted according to the characteristics required of the non-ohmic composition, and from a viewpoint of obtaining the desired varistor characteristics, the varistor grains are preferably blended to the base polymer with a volume ratio of 0.2 or higher. On the other hand, because the tensile properties of the non-ohmic composition deteriorate according to the blending of the varistor grains, from a viewpoint of maintaining the good tensile properties, the varistor grains are preferably blended to the base polymer with a volume ratio of 0.5 or lower. In other words, the varistor characteristics and the tensile properties of the non-ohmic composition can be simultaneously satisfied at a high level, by setting the blending amount of the varistor grains to 0.2 to 0.5 in volume ratio.

Other additives may be appropriately blended to the non-ohmic composition. For example, a crosslinking agent, an antioxidant, a plasticizer, or the like may be used for the additive.

<Method for Manufacturing Non-Ohmic Compound>

Next, a method for manufacturing the above-mentioned non-ohmic composition will be described.

First, the coarse varistor grains formed to have the relatively large grain diameters are prepared. The coarse varistor grains are obtained by mixing a metal oxide (for example, zinc oxide) that forms the main component, a metal oxide (for example, bismuth), water, a dispersing agent, or the like, that are added, for example, and forming the mixture into grains having a predetermined grain diameter using a spray dryer. The size of the coarse varistor grains is preferably a size that enables crushing by the airflow type method, and an average grain diameter is 25 µm to 100 µm, for example.

Next, the coarse varistor grains are crushed to a size that does not cause collapsing when kneaded with the base polymer, that is, so that the maximum grain diameter becomes 30 µm or less, to obtain the varistor grains. In this case, because the airflow type method is used for the crushing, the grain boundary parts exist at the surface, and it is possible to obtain varistor grains having good varistor characteristics even though the grain diameter is small.

Inconsistencies in the grain diameters of the varistor grains can be reduced because the airflow type method is used for the crushing, and thus, the crushed varistor grains may be used as they are, however, the varistor grains may be sifted to further reduce the inconsistencies in the grain diameters. In addition, when providing the surface-treated layer on the varistor grains, the varistor grains obtained by the crushing are preferably dipped into a process liquid including the silane coupling agent and heated.

Next, the varistor grains and the other additives, such as the crosslinking agent or the like, are added to the base polymer. In this case, the varistor grains are preferably added to the base polymer with a volume ratio of 0.2 to 0.5.

Next, the mixture that is obtained is kneaded, to obtain the non-ohmic composition. In this embodiment, because the maximum grain diameter of the varistor grains is 30 µm or less, it is possible to reduce the collapse of the varistor grains and the inconsistencies in the grain diameter thereof, even when the varistor grains are kneaded with the base polymer that is formed by the rubber having the high Mooney viscosity. In other words, the non-ohmic composition can be adjusted without greatly changing the inconsistencies in the grain diameters (grain size distribution) of the varistor grains before and after the kneading.

The non-ohmic composition can be manufactured by the above described process.

<Cable Interconnect Unit>

Figure 2:
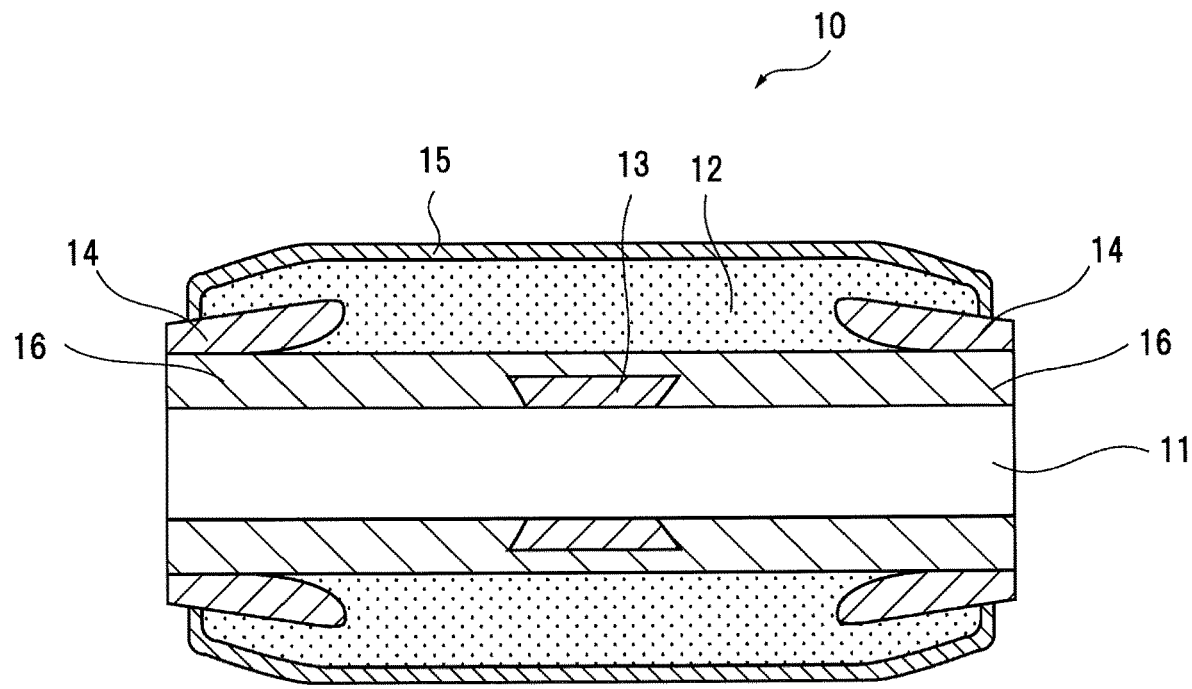
FIG. 2 is a cross sectional view, along an axial direction, of a cable interconnect unit according to one embodiment of the present invention.

Next, the cable interconnect unit according to one embodiment of the present invention will be described by referring to the drawings. FIG. 2 is a cross sectional view, along an axial direction, of the cable interconnect unit according to one embodiment of the present invention.

A cable interconnect unit 10 (hereinafter also simply referred to as an interconnect unit 10) according to this embodiment is formed as a tubular body including a hollow part 11 that penetrates along the axial direction. The interconnect unit 10 is configured so that a pair of power cables is inserted from respective ends of the hollow part 11, and end parts of the power cables abut each other and are joined linearly inside the hollow part 11. An inner diameter of the interconnect unit 10 is smaller than an outer diameter of a joint of the power cables, but the inner diameter is enlarged to be mounted on the joint of the power cables. In addition, the power cable is for a high voltage of 300 kV or higher, and is formed as a Cross-linked polyethylene insulated Vinyl-chloride sheath cable (CV cable) including, from a center toward the outer side, a conductor, a cable inner semiconductive layer, a cable insulating layer, a cable outer semiconductive layer, a shield layer, and a corrosion-proof layer.

The interconnect unit 10 according to this embodiment is formed by a tubular insulating tube 12, an inner semiconductive layer 13, stress cone parts 14, an outer semiconductive layer 15, and a non-ohmic resistor layer 16, as illustrated in FIG. 2.

The insulating tube 12 is formed by an insulating rubber, such as ethylene propylene rubber, silicone rubber, or the like, for example, and is a tubular body including the hollow part 11 that penetrates along the axial direction. The insulating tube 12 is preferably formed by the same kind of rubber as the inner semiconductive layer 13 or the like, because the insulating tube 12 is formed by molding, as will be described later. The insulating tube 12 is resilient, and the diameter thereof may be freely enlarged.

The non-ohmic resistor layer 16 is provided inside the insulating tube 12, so as to cover an inner peripheral surface of the insulating tube 12. The non-ohmic resistor layer 16 is formed to a tubular shape by molding or extrusion molding, for example, using the above-mentioned non-ohmic composition. The non-ohmic resistor layer 16 is arranged across the cable insulating layer and the cable outer semiconductive layer of the stripped power cables, and relaxes the concentration of the electric field at the joint of the power cables. A thickness of the non-ohmic resistor layer 16 is not particularly limited, but may preferably be 3 mm to 20 mm, for example.

The inner semiconductive layer 13 is provided on the non-ohmic resistor layer 16, at a central part along the axial direction of the insulating tube 12. In FIG. 2, the inner semiconductive layer 13 is embedded in the non-ohmic resistor layer 16 to form a single surface together with the inner semiconductive layer 13. The inner semiconductive layer 13 is famed to a tubular shape using a semiconductive rubber composition in which carbon black or the like is blended to the same kind of rubber as the insulating tube 12, for example. The inner semiconductive layer 13 is arranged to make contact with a crimping sleeve that joins the conductors of the pair of power cables by a compression joint, and is configured to become the same potential as the conductors of the power cables.

One pair of stress cone parts 15 is provided on respective ends of the insulating tube 12 on the inner periphery thereof, so as to be exposed from the respective ends. The stress cone part 14 has a shape having a diameter that flares toward the center of the hollow part 11 of the insulating tube 12. The stress cone part 14 is formed by a semiconductive rubber material, similar to the internal semiconductive layer 13, and is arranged separated from the inner semiconductive layer 13 and across the cable insulating layer and the cable outer semiconductive layer of stripped power cables via the non-ohmic resistor layer 16. According to the stress cone parts 14, a potential distribution at the joint of the power cables is formed to be gradual along the shape of the stress cone parts 14, to relax the concentration of the electric field.

The outer semiconductive layer 15 is provided to cover an outer periphery of the insulating tube 12. The outer semiconductive layer 15 is formed by a semiconductive rubber composition similar to the inner semiconductive layer 13.

The interconnect unit 10 includes the inner semiconductive layer 13, the stress cone parts 14, the outer semiconductive layer 15, and the non-ohmic resistor layer 16 that are formed integrally with the insulating tube 12, and may be formed in the following manner, for example. First, the inner semiconductive layer 13, the stress cone parts 14, the outer semiconductive layer 15, and the non-ohmic resistor layer 16 are molded separately using predetermined molds, respectively. In this case, the inner semiconductive layer 13, the stress cone parts 14, and the outer semiconductive layer 15 are formed by semiconductive resins. The non-ohmic resistor layer 16 is formed by the above-mentioned non-ohmic composition. Next, the inner semiconductive layer 13, the stress cone parts 14, the outer semiconductive layer 15, and the non-ohmic resistor layer 16 are set in a predetermined mold, and a cored bar that becomes the hollow part 11 is arranged at a center of the annular inner semiconductive layer 13 and non-ohmic resistor layer 16. In this state, rubber is injected into the mold, to form (over-mold) the insulating tube 12 between the inner semiconductive layer 13, the stress cone parts 14, the outer semiconductive layer 15, and the non-ohmic resistor layer 16. Then, the interconnect unit 10 is removed from the mold, and unwanted parts are removed from the interconnect unit 10. Accordingly, it is possible to form the interconnect unit 10 integrally including the insulating tube 12, the inner semiconductive layer 13, the stress cone parts 14, the outer semiconductive layer 15, and the non-ohmic resistor layer 16.

The interconnect unit 10 can be manufactured by the above described process.

Effects of this Embodiment

According to this embodiment, one or a plurality of effects described below can be obtained.

The interconnect unit 10 according to this embodiment is formed to include the non-ohmic resistor layer 16 that includes the varistor grains, at the joint of the power cables, so as to make contact with the stripped power cables. Because the non-ohmic resistor layer 16 includes the varistor grains, it is possible to relax the concentration of the electric field at the joint of the power cables. More particularly, the non-ohmic resistor layer 16 shows varistor characteristics in which a non-linear index α, described in exemplary implementations described later, is preferably 1.3 or greater, and more preferably 4.0 or greater.

In addition, the varistor grains included in the non-ohmic resistor layer 16 are formed to have the maximum grain diameter of 30 μm or less, and the reduced inconsistencies in the grain diameters. For this reason, the non-ohmic resistor layer 16 has a high insulation breakdown strength. More particularly, a DC insulation breakdown strength is preferably 7 kV/mm or higher, and more preferably 10 kV/mm or higher. Further, an impulse insulation breakdown strength (Imp insulation breakdown strength) is preferably 10 kV/mm or higher, and more preferably 15 kV/mm or higher.

Hence, in the interconnect unit 10 according to this embodiment, it is possible to stably relax the concentration of the electric field for a long period of time, at the joint of the high-voltage power cables.

Preferably, the varistor grains included in the non-ohmic resistor layer 16 have the grain diameter D50 at 50% accumulation of 1.0 μm to 10 μm, the grain diameter D90 at 90% accumulation of 2.0 μm to 25 μm in the volume grain size distribution, and the D90/D50 is 2.5 or less. Because the inconsistencies in the grain diameters of the varistor grains having such a grain size distribution are small, the high insulation breakdown strength can be maintained in the non-ohmic resistor layer 16.

The base polymer forming the non-ohmic resistor layer 16 is preferably rubber having the Mooney viscosity (ML(1+4)100° C.) that is 35 or higher and 60 or lower. Because the tensile properties of the non-ohmic resistor layer 16 can be improved using the rubber having such a viscosity, it is possible to reduce damage to the ohmic resistor layer 16 when the diameter of the interconnect unit 10 is enlarged.

In the non-ohmic resistor layer 16, the varistor grains are preferably added to the base polymer with a volume ratio of 0.2 to 0.5. By adding such an amount of varistor grains, it is possible to generate desired varistor characteristics, and also obtain good tensile properties, in the non-ohmic resistor layer 16. More particularly, as described later in conjunction with the exemplary implementations, the non-ohmic resistor layer 16 has tensile properties such that the stretch at break is 100% or greater, and the tensile breaking strength is 5 MPa or greater.

The varistor grains are provided with the surface-treated layer including the silane compound. The surface-treated layer not only reduces cohesion of the varistor grains, but also increases adhesion to the base polymer, and improves tensile properties (stretch at break, and tensile breaking strength) of the non-ohmic resistor layer 16. Moreover, interfacial peeling between the base polymer and the varistor grains can be reduced, to improve the varistor characteristics of the non-ohmic resistor layer 16.

In addition, as illustrated in FIG. 1, the varistor grain 1 is formed by crushing the coarse varistor grain 1A that is a polycrystalline grain in which the crystal parts 1a are bonded via the grain boundary parts 1b, by the airflow type method, and preferably includes the grain boundary parts 1b formed at the surface. The varistor grains 1 obtained by such an airflow type method include a large number of interfaces between the crystal parts 1a and the grain boundary parts 1b, to thereby exhibit excellent varistor characteristics, even though the maximum grain diameter is 30 μm or less and relatively small.

Other Embodiments

One embodiment of the present invention is particularly described above, however, the present invention is not limited to the above-mentioned embodiment, and modifications may be appropriately made within the scope of the subject matter thereof.

In the above-mentioned embodiment, the stress cone parts 14 are provided in the interconnect unit 10 of the described example, however, the present invention is not limited to the configuration provided with the stress cone parts 14. For example, instead of providing the stress cone parts 14, both ends of the insulating tube 12 may be tapered to gradually narrow, so as to relax the concentration of the electric field at both ends.

Further, in this embodiment, the non-ohmic resistor layer 16 is formed from the non-ohmic composition and provided in the cable interconnect unit 10 of the described example, however, the present invention is not limited to the configuration provided with the non-ohmic composition in the cable interconnect unit 10. For example, the non-ohmic composition may be used for a cable end-connect part.

Figure 3:
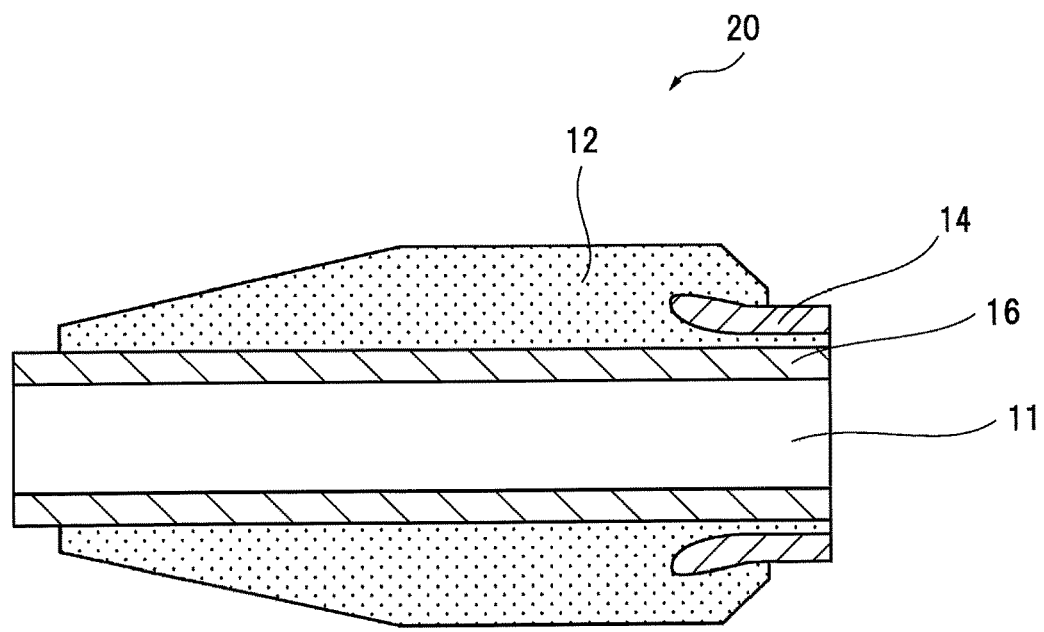
FIG. 3 is a cross sectional view, along an axial direction, of a cable end-connect unit according to one embodiment of the present invention.

The cable end-connect part includes a porcelain tube inserted with the power cable, and a tubular cable end-connect unit mounted on the power cable, and is configured to be filled with an insulating material, such as an insulating oil, inside the porcelain tube. This cable end-connect unit may be provided with the non-ohmic resistor layer that is formed by the non-ohmic composition. More particularly, as illustrated in FIG. 3, a cable end-connect unit 20 has a configuration including a tubular insulating tube 12 having a hollow part 11, a stress cone part 14 that is provided to be exposed from one end of the insulating tube 12, and a non-ohmic resistor layer 16 that is formed from the non-ohmic composition and is provided on an inner peripheral surface of the insulating tube 12.

This cable end-connect unit 20 is arranged across the cable insulating layer and the cable outer semiconductive layer of the stripped power cable. According to the cable end-connect unit 20, it is possible to obtain effects similar to the above-mentioned cable interconnect unit 10. In FIG. 3, those parts that are similar to the parts in FIG. 2 are designated by the same reference numerals as FIG. 2.

Exemplary Implementations

Next, a more detailed description will be made based on the following exemplary implementations of the present invention, however, the present invention is not limited to these exemplary implementations.

In the exemplary implementations, the following materials were used. FIG. 4 is a table for explaining compositions and evaluations of the exemplary implementations and a comparison example.

Ethylene-Propylene-Diene-Monomer (EPDM, ML(1+4) 100° C.: 35) was used as the base polymer.

Zinc oxide varistor grains including zinc oxide, and a small amount of another metal oxide, such as bismuth, antimony, or the like, were used as the varistor grains. The grain diameter and the surface treatment differ among the exemplary implementations. The following 4 kinds of zinc oxide varistor grains A to D (hereinafter also simply referred to as varistor grains A to D) were used.

Zinc oxide varistor grains A (maximum grain diameter: 30 μm, D50: 10 μm, D90: 19 μm, D90/D50: 1.9)

Zinc oxide varistor grains B (maximum grain diameter: 10 μm, D50: 3.2 μm, D90: 6.4 μm, D90/D50: 2.0)

Zinc oxide varistor grains C (maximum grain diameter: 10 μm, D50: 3.2 μm, D90: 6.4 μm, D90/D50: 2.0, hydrophobic surface treatment)

Zinc oxide varistor grains D (maximum grain diameter: 100 μm, D50: 50 μm, D90: 87 μm, D90/D50: 1.74)

The varistor grains A are obtained by crushing the varistor grains D using an airflow type crusher so that the maximum grain diameter becomes 30 μm or less. The varistor grains B are obtained by crushing the varistor grains D using the airflow type crusher so that the maximum grain diameter becomes 10 μm or less. The varistor grains C are obtained by dipping and heating the varistor grains B in an ethanol solution of triethoxyvinylsilane, to perform a hydrophobic surface treatment on the grain surface.

The following additives were used as the other additives.

Crosslinking agent: dicumyl peroxide (DCP)
Coagent: zinc flower number 3
Plasticizer: polybutadiene oil
Antioxidant: amine TMDQ
<Making Samples>

Exemplary Implementation 1

First, the non-ohmic composition was adjusted according to the formulation illustrated in FIG. 4. More particularly, with respect to 100 parts by mass of EPDM, 310 parts by mass of the varistor grains A are added so that the volume ratio with respect to the EPDM becomes 0.3, and 1.5 parts by mass of DCP, 5 parts by mass of zinc flower 3, 10 parts by mass of polybutadiene oil, and 1.5 parts by mass of TMDQ were added as the other additives and kneaded, to adjust the non-ohmic composition of an exemplary implementation 1. Next, the obtained non-ohmic composition was pressure-molded at a temperature of 160° C. for 1 hour, to make a sample sheet simulating the non-ohmic resistor layer that is used for the connect unit. In FIG. 4, the unit of each adding amount is parts by mass.

Exemplary Implementations 2 and 3

In exemplary implementations 2 and 3, the kind of varistor grains used was changed from the varistor grains A to the varistor grains B and the varistor grains C, respectively, as illustrated in FIG. 4. Otherwise, the non-ohmic compositions were adjusted similarly to the exemplary implementation 1, to make the samples.

Exemplary Implementations 4 to 7

In exemplary implementations 4 to 7, the blending amount of the varistor grains C was changed, as illustrated in FIG. 4, but otherwise, the non-ohmic compositions were adjusted similarly to the exemplary implementation 3, to make the samples.

Comparison Example 1

In a comparison example 1, the varistor grains D having the maximum grain diameter of 100 μm were used, as illustrated in FIG. 4, but otherwise, the non-ohmic composition was adjusted similarly to the exemplary implementation 1, to make the sample.

Evaluation Method

The non-ohmic resistance characteristics, the insulation breakdown strength, and the tensile properties of each of the samples made were evaluated according to the following method.

The non-ohmic resistance characteristics (or varistor characteristics) were evaluated by sandwiching the sample sheet by circular parallel plate electrodes including a guard electrode, applying predetermined voltages stepwise between the electrodes, measuring a current flowing between the electrodes using a micro ammeter, substituting the obtain current value into the following formula (1), and computing a volume resistivity with respect to a predetermined voltage (electric field).

$$\rho = S \cdot V / t \cdot I \quad (1)$$

where ρ: volume resistivity, S: electrode area, t: thickness of sample, V: applied voltage, and I: measured current.

Figure 5:
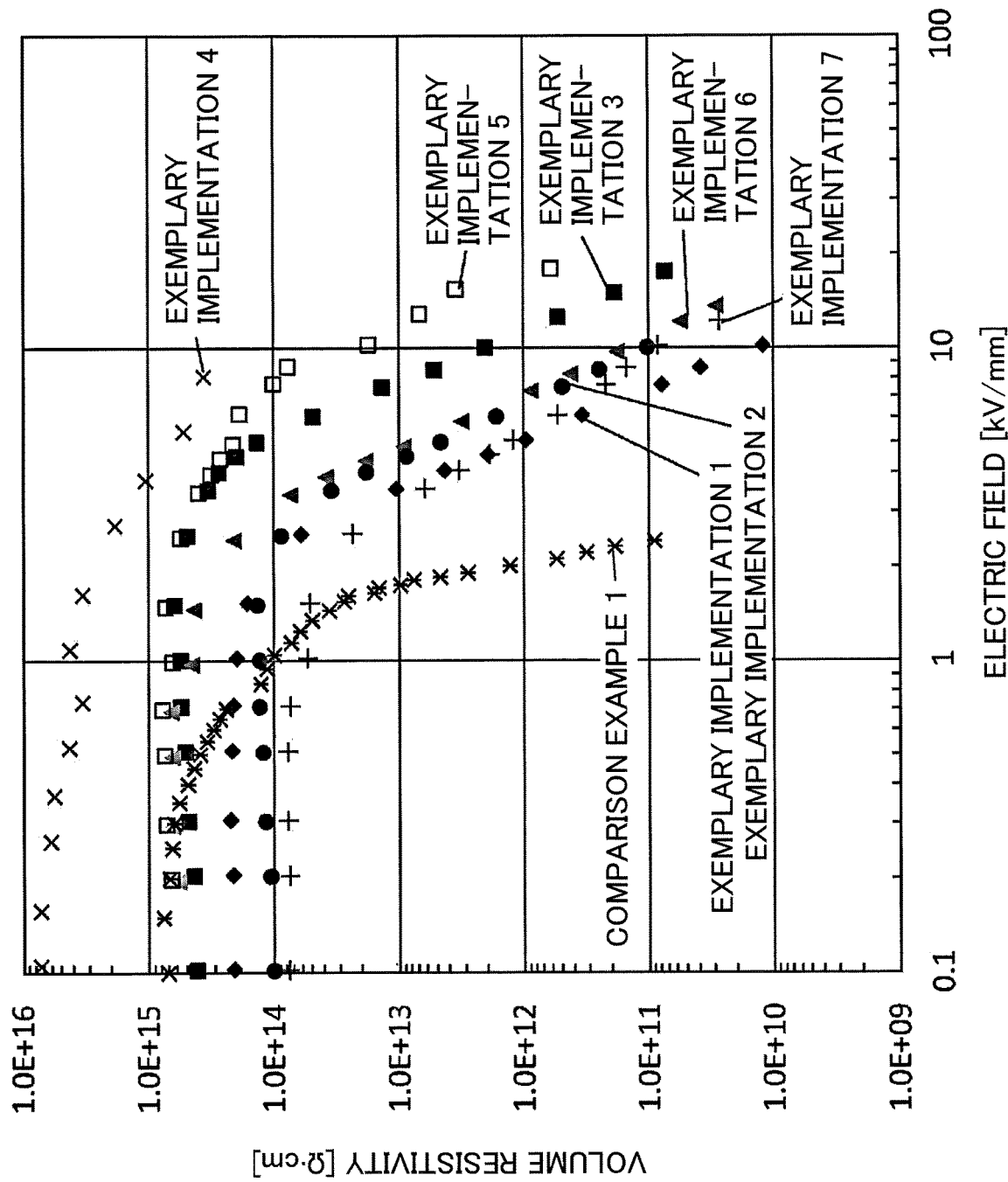
FIG. 5 is a diagram illustrating a correlation between an electric field intensity and a volume resistivity of each of samples of the exemplary implementations.

A change in the volume resistivity of the sample of the exemplary implementation 1 when the electric field is varied, is illustrated in FIG. 5. FIG. 5 is a diagram illustrating a correlation between an electric field intensity and the volume resistivity of each of the samples of the exemplary implementations, and the abscissa indicates the electric field intensity [kV/mm], and the ordinate indicates indicates the volume resistivity [Ω·cm]. In a region in which the volume resistivity changes with respect to the electric field, a relationship represented by the following formula (2) stands with respect to the volume resistivity and the electric field. In the exemplary implementations, the higher the value of a in the formula (2) becomes, the more the non-linearity improves and the more excellent the material becomes.

$$\rho = KE - \alpha \quad (2)$$

where E: electric field intensity, α: non-linear index, and K: constant.

The insulation breakdown strength was evaluated by measuring a DC insulation breakdown strength and an impulse insulation breakdown strength (hereinafter also referred to as "Imp insulation breakdown strength"). The DC insulation breakdown strength was computed by applying a DC high voltage between the circular parallel plate electrodes sandwiching the sample sheet at a rate of rise of 2 kV/min under a room temperature environment, and dividing a voltage at which the insulation breakdown occurs by the thickness of the sample sheet. The Imp insulation breakdown strength was computed by applying a negative polarity Imp voltage stepwise between the circular parallel plate electrodes sandwiching the sample sheet at a rising step of −5 kV under the room temperature environment, and dividing the voltage at which the insulation breakdown occurs by the thickness of the sample sheet. In the exemplary implementations, it was judged that the insulation breakdown strength is excellent when the DC insulation breakdown strength is 7 kV/mm or higher, and the Imp insulation breakdown strength is 10 kV/mm or higher.

The tensile properties were measured and evaluated from the stretch at break and the tensile breaking strength. A tensile test used a sample punched into a dumbbell shape of JIS standard number 3, applied a stretching strain at a constant velocity of 200 mm/min using a tensile tester (3343 by INSTRON), regarded the stretch rate when the breakdown occurred as the stretch at break, and regarded the strength when the breakdown occurred as the tensile breaking strength. In the exemplary implementations, it was judged that the tensile properties are excellent when the stretch at break is 100% or greater, and the tensile breaking strength is 5 MPa or greater.

Evaluation Results

Evaluation results of each of the exemplary implementations and the comparison example are summarized in FIG. 4.

In the exemplary implementations 1 to 7, it was confirmed that the desired varistor characteristics, insulation breakdown strength, and tensile properties are obtainable, as illustrated in FIG. 4 and FIG. 5. When each sample was observed on a Scanning Electron Microscope (SEM), it was confirmed that the inconsistencies in the grain diameters of the scattered varistor grains are small, and that the collapse of the varistor grains during the kneading can be reduced.

According to the exemplary implementation 1 and the exemplary implementation 2, it was confirmed that the insulation breakdown strength can be improved, by making the maximum grain diameter of the varistor grains 10 μm or less. It may be regarded that this improvement is achieved because the inconsistencies in the grain diameters of the varistor grains can be reduced in the samples that are molded bodies.

According to the exemplary implementation 2 and the exemplary implementation 3, it was confirmed that the insulation breakdown strength and the tensile properties can be improved, by performing the hydrophobic surface treatment on the varistor grains and improving the adhesion between the base polymer and the varistor grains in the molded bodies.

According to the exemplary implementations 4 to 7, it was confirmed that the blending amount of the varistor grains with respect to the base polymer in volume ratio is preferably 0.2 or higher, because more improved varistor characteristics can be obtained by setting the non-linear index to 4 or greater. In addition, from a viewpoint of obtaining a higher insulation breakdown strength, it was confirmed that the blending amount of the varistor grains with respect to the base polymer in volume ratio is preferably 0.5 or lower.

On the other hand, in the comparison example 1, the desired varistor characteristics are obtained, however, it was confirmed that the insulation breakdown strength deteriorates considerably. When the sample of the comparison example 1 was observed on the SEM, it was confirmed that the grain diameters greatly vary, because the varistor grains scattered in the sample include collapsed grains having reduced grain diameters and grains maintaining the original size.

As described heretofore, according to the disclosed embodiments and exemplary implementations, the collapse of the grains during the kneading can be reduced, and the inconsistencies in the grain diameters can be reduced, by crushing the varistor grains so that the maximum grain diameter becomes 30 μm or less, and adjusting the non-ohmic composition by kneading the varistor grains together with the base polymer. As a result, when the non-ohmic resistor layer is formed as the molded body, it is possible to maintain a high insulation breakdown strength while generating the desired varistor characteristics.

Although the exemplary implementations are numbered with 1 to 7, the ordinal numbers do not imply priorities of the exemplary implementations.

Preferable Aspects of Present Invention

Preferable aspects of the present invention are appended in the following.

[Appended Claim 1]

According to one embodiment, there is provided a tubular cable interconnect unit arranged on an outer periphery of a joint of a power cable, comprising:

a tubular insulating tube;

a non-ohmic resistor layer formed from a non-ohmic composition and provided on an inner peripheral surface of the insulating tube; and an inner semiconductive layer provided on the non-ohmic resistor layer, wherein the non-ohmic composition includes a base polymer including at least one of thermoplastic and rubber, and varistor grains having a non-ohmic characteristic in which a volume resistivity varies non-linearly with respect to an applied voltage, and the varistor grains have a maximum grain diameter of 30 μm or less.

[Appended Claim 2]

Preferably, in the cable interconnect unit of appended claim 1, the varistor grains have a grain diameter D50 at 50% accumulation that is 1.0 μm to 10 μm, a grain diameter D90 at 90% accumulation that is 2.0 μm to 25 μm in the volume grain size distribution, and D90/D50 that is 2.5 or less.

[Appended Claim 3]

Preferably, in the cable interconnect unit of appended claim 1 or 2, the varistor grains have the maximum grain diameter of 10 μm or less.

[Appended Claim 4]

Preferably, in the cable interconnect unit of any one of appended claims 1 to 3, the base polymer is rubber having a Mooney viscosity (ML(1+4)100° C.) that is 35 or higher and 60 or lower.

[Appended Claim 5]

Preferably, in the cable interconnect unit of any one of appended claims 1 to 4, the base polymer is ethylene-propylene-diene-monomer.

[Appended Claim 6]
Preferably, in the cable interconnect unit of any one of appended claims 1 to 5, the varistor grains are zinc oxide varistor grains.

[Appended Claim 7]
Preferably, in the cable interconnect unit of any one of appended claims 1 to 6, the non-ohmic composition includes the varistor grains with respect to the base polymer in volume ratio that is in a range of 0.2 or higher and 0.5 or lower.

[Appended Claim 8]
Preferably, in the cable interconnect unit of any one of appended claims 1 to 7, the varistor grains include a surface-treated layer that includes a silane compound.

[Appended Claim 9]
Preferably, in the cable interconnect unit of any one of appended claims 1 to 8, the non-ohmic resistor layer has a DC insulation breakdown strength of 7 kV/mm or higher, and an impulse insulation breakdown strength of 10 kV/mm or higher.

[Appended Claim 10]
Preferably, in the cable interconnect unit of any one of appended claims 1 to 9, the varistor grains include crystal parts including a metal oxide, and grain boundary parts including another metal oxide, and the grain boundary parts are formed at surfaces of the varistor grains.

[Appended Claim 11]
According to another embodiment, there is provided a tubular cable end-connect unit arranged on an outer periphery of a power cable accommodated within a porcelain tube, comprising:
a tubular insulation tube; and
a non-ohmic resistor layer formed from a non-ohmic composition and provided on an inner peripheral surface of the insulating tube,
wherein the non-ohmic composition includes a base polymer including at least one of thermoplastic and rubber, and varistor grains having a non-ohmic characteristic in which a volume resistivity varies non-linearly with respect to an applied voltage, and the varistor grains have a maximum grain diameter of 30 μm or less.

[Appended Claim 12]
According to another embodiment, there is provided a non-ohmic composition comprising:
a base polymer including at least one of thermoplastic and rubber; and
varistor grains having a non-ohmic characteristic in which a volume resistivity varies non-linearly with respect to an applied voltage,
wherein the varistor grains have a maximum grain diameter of 30 μm or less.

[Appended Claim 13]
According to still another embodiment, there is provided a method for manufacturing a non-ohmic composition, comprising:
a crushing process that crushes coarse varistor grains having a non-ohmic characteristic in which a volume resistivity varies non-linearly with respect to an applied voltage into varistor grains having a maximum diameter of 30 μm or less; and
a mixing process that mixes the varistor grains with a base polymer including at least one of thermoplastic and rubber.

[Appended Claim 14]
Preferably, in the method for manufacturing the non-ohmic composition of appended claim 13, the crushing process crushes the coarse varistor grains using airflow type method.

DESCRIPTION OF THE REFERENCE NUMERALS

1 Varistor Grain
1A Coarse Varistor Grain
1a Crystal Part
1b Grain Boundary Part
10 Cable Interconnect Unit
11 Hollow Part
12 Insulating Tube
13 Inner Semiconductive Layer
14 Stress Cone Part
15 Outer Semiconductive Layer
16 Non-Ohmic Resistor Layer
20 Cable End-Connect Unit
20

The invention claimed is:
1. A tubular cable interconnect unit arranged on an outer periphery of a joint of a power cable, comprising:
a tubular insulating tube;
a non-ohmic resistor layer formed from a non-ohmic composition and provided on an inner peripheral surface of the insulating tube; and
an inner semiconductive layer provided on the non-ohmic resistor layer,
wherein the non-ohmic composition includes a base polymer including at least one of thermoplastic and rubber, and varistor grains having a non-ohmic characteristic in which a volume resistivity varies non-linearly with respect to an applied voltage, and having a maximum grain diameter of 30 μm or less, and
wherein the varistor grains have a rain diameter D50 at 50% accumulation that is within a range of from 1.0 μm to 10 μm, and a grain diameter D90 at 90% accumulation that is within a range of from 2.0 μm to 25 μm in the volume grain size distribution, and D90/D50 that is 2.5 or less.

2. The cable interconnect unit as claimed in claim 1, wherein the varistor grains have the maximum grain diameter of 10 μm or less.

3. The cable interconnect unit as claimed in claim 1, wherein the base polymer is rubber having a Mooney viscosity (ML(1+4)100° C.) that is 35 or higher and 60 or lower.

4. The cable interconnect unit as claimed in claim 1, wherein the base polymer is ethylene-propylene-diene-monomer.

5. The cable interconnect unit as claimed in claim 1, wherein the varistor grains are zinc oxide varistor grains.

6. The cable interconnect unit as claimed in claim 1, wherein the non-ohmic composition includes the varistor grains with respect to the base polymer in volume ratio that is in a range of 0.2 or higher and 0.5 or lower.

7. The cable interconnect unit as claimed in claim 1, wherein the varistor grains include a surface-treated layer that includes a silane compound.

8. The cable interconnect unit as claimed in claim 1, wherein the non-ohmic resistor layer has a DC insulation breakdown strength of 7 kV/mm or higher, and an impulse insulation breakdown strength of 10 kV/mm or higher.

9. The cable interconnect unit as claimed in claim 1, wherein the varistor grains include crystal parts including a metal oxide, and grain boundary parts including another metal oxide, and the grain boundary parts are formed at surfaces of the varistor grains.

10. A tubular cable end-connect unit arranged on an outer periphery of a power cable accommodated within a porcelain tube, comprising:
   a tubular insulation tube; and
   a non-ohmic resistor layer formed from a non-ohmic composition and provided on an inner peripheral surface of the insulating tube,
   wherein the non-ohmic composition includes a base polymer including at least one of thermoplastic and rubber, and varistor grains having a non-ohmic characteristic in which a volume resistivity varies non-linearly with respect to an applied voltage, and having a maximum grain diameter of 30 µm or less, and
   wherein the varistor rains have a grain diameter D50 at 50% accumulation that is within a range of from 1.0 µm to 10 µm, and a rain diameter D90 at 90% accumulation that is within a range of from 2.0 µm to 25 µm in the volume grain size distribution, and D90/D50 that is 2.5 or less.

11. The cable end-connect unit as claimed in claim 10, wherein the varistor grains have the maximum grain diameter of 10 µm or less.

12. The cable end-connect unit as claimed in claim 10, wherein the base polymer is one of rubber having a Mooney viscosity (ML(+4)100° C.) that is 35 or higher and 60 or lower, and ethylene-propylene-diene-monomer.

13. A non-ohmic composition comprising:
   a base polymer including at least one of thermoplastic and rubber; and
   varistor grains having a non-ohmic characteristic in which a volume resistivity varies non-linearly with respect to an applied voltage,
   wherein the varistor grains have a maximum grain diameter of 30 µm or less, and
   wherein the varistor grains have a grain diameter D50 at 50% accumulation that is within a range of from 1.0 µm to 10 µm, and a rain diameter D90 at 90% accumulation that is within a range of from 2.0 µm to 25 µm in the volume grain size distribution, and D90/D50 that is 2.5 or less.

14. A method for manufacturing a non-ohmic composition, comprising:
   crushing coarse varistor grains having a non-ohmic characteristic in which a volume resistivity varies non-linearly with respect to an applied voltage into varistor grains having a maximum diameter of 30 µm or less; and
   mixing the varistor grains with a base polymer including at least one of thermoplastic and rubber,
   wherein the crushing obtains the varistor grains having a grin diameter D50 at 50% accumulation that is within a range of from 1.0 µm to 10 µm, and a grain diameter D90 at 90% accumulation that is within a range of from 2.0 µm to 25 µm in the volume train size distribution, and D90/D50 that is 2.5 or less.

15. The method for manufacturing the non-ohmic composition as claimed in claim 14, wherein the crushing crushes the coarse varistor grains using airflow type method.

16. The method for manufacturing the non-ohmic composition as claimed in claim 14, wherein the crushing obtains the varistor grains having the maximum grain diameter of 10 µm or less.

17. The method for manufacturing the non-ohmic composition as claimed in claim 14, wherein the mixing uses rubber having a Mooney viscosity (ML(1+4)100° C.) that is 35 or higher and 60 or lower, or ethylene-propylene-diene-monomer, as the base polymer.

* * * * *